United States Patent
Frey, Jr.

(10) Patent No.: US 6,208,723 B1
(45) Date of Patent: *Mar. 27, 2001

(54) SYSTEM AND METHOD FOR ENHANCED AUTOMATIC RECALL

(75) Inventor: Bert L. Frey, Jr., Allen, TX (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,145

(22) Filed: Apr. 2, 1998

(51) Int. Cl.[7] .................................................. H04M 3/48
(52) U.S. Cl. ..................... 379/201; 379/207; 379/209; 379/210; 379/212
(58) Field of Search .................................... 379/201, 207, 379/209, 211, 210, 219, 220, 229, 230, 212

(56) References Cited

U.S. PATENT DOCUMENTS

| | | | |
|---|---|---|---|
| 3,859,473 | * 1/1975 | Brown et al. | 379/209 |
| 5,268,957 | * 12/1993 | Albrecht | 379/209 |
| 5,425,091 | * 6/1995 | Josephs | 379/209 |
| 5,533,100 | * 7/1996 | Bass et al. | 379/209 |
| 5,577,111 | * 11/1996 | Iiada et al. | 379/209 |
| 5,590,183 | * 12/1996 | Yoneda et al. | 379/209 |
| 5,590,187 | * 12/1996 | Greenspan | 379/212 |
| 5,634,196 | 5/1997 | Alford | 455/54.2 |
| 5,644,624 | 7/1997 | Caldwell | 379/69 |
| 5,657,383 | 8/1997 | Gerber et al. | 379/266 |
| 5,661,790 | * 8/1997 | Hsu | 379/209 |
| 5,692,033 | * 11/1997 | Farris | 379/209 |
| 5,712,902 | * 1/1998 | Florence et al. | 379/211 |
| 5,933,485 | * 8/1999 | Chang et al. | 379/209 |
| 5,943,409 | * 8/1999 | Malik | 379/209 |

* cited by examiner

*Primary Examiner*—Ahmad Matar
*Assistant Examiner*—William J. Deane, Jr.
(74) *Attorney, Agent, or Firm*—Jenkens & Gilchrist, P.C.

(57) ABSTRACT

A telecommunications system and method is disclosed for allowing an attendant to initiate an automatic recall feature for a third party when that third party's line is busy. When a calling party dials a number associated with an attendant, e.g., a switchboard operator, and the desired called subscriber's line is busy, the calling party can request the attendant to initiate an automatic recall feature for the desired called subscriber. In order to implement this recall feature, the attendant can then dial a service code followed by the desired called subscriber's extension. Thereafter, the system monitors the desired called subscriber's line until it becomes idle. As soon as the line becomes idle, the desired called subscriber receives a special ring back tone. When the desired called subscriber "answers" the call, a call connection from the desired called subscriber to the calling party is initiated.

24 Claims, 5 Drawing Sheets

SYSTEM AND METHOD FOR ENHANCED AUTOMATIC RECALL

BACKGROUND OF THE PRESENT INVENTION

1. Field of the Invention

The present invention relates generally to telecommunications systems and methods for automatically ringing a subscribers telephone once the subscriber's line becomes idle, and specifically to allowing an attendant to implement a recall feature for a third party when that party's line is busy.

2. Background and Objects of the Present Invention

Since the beginning of the telephone in the 1870's, signaling has been an integral part of telephone communications. Such signaling typically includes the call setup, such as ringing the called party, and tear-down procedures. In modern telecommunications networks, signaling constitutes the distinct control infrastructure that enables provision of all other services. It can be defined as the system that enables stored program control exchanges, network databases, and other "intelligent" nodes of the network to exchange: (a) messages related to call setup, supervision, and tear-down; (b) information needed for distributed applications processing (interprocess query/response); and (c) network management information.

In addition, the Intelligent Network (IN) and the new Advanced Intelligent Network (AIN) have made possible the transfer of all types of information through the telephone network without special circuits or long installation cycles. In the IN, everything is controlled or configured by workstations with user-friendly software. Telephone service representatives can, therefore, create new services and tailor a subscriber's service from a terminal while talking with the customer. These changes are immediately and inexpensively implemented in the switches, rather than by the more traditional method: expensive programming changes made by certified technicians.

The IN consists of a series of intelligent nodes, each capable of processing at various levels, and each capable of communicating with one another over data links. Currently, the IN relies on the Signaling System #7 (SS7) network, which provides the basic infrastructure needed for the various signaling points in the IN. SS7, in turn, relies on Common Channel Signaling, which uses a digital facility, but places the signaling information in a time slot or channel separate from the voice and data to which it is related. This allows signaling information to be consolidated and sent through its own network apart from the voice network.

The various signaling points in the IN both perform message discrimination (read the address and determine if the message is for that node), and route messages to other signaling points. The basic three types of signaling points are: (1) Service Switching Points (SSPs); (2) Signal Transfer Points (STPs); and (3) Service Control Points (SCPs), each of which are described in more detail hereinafter.

Figure 1:
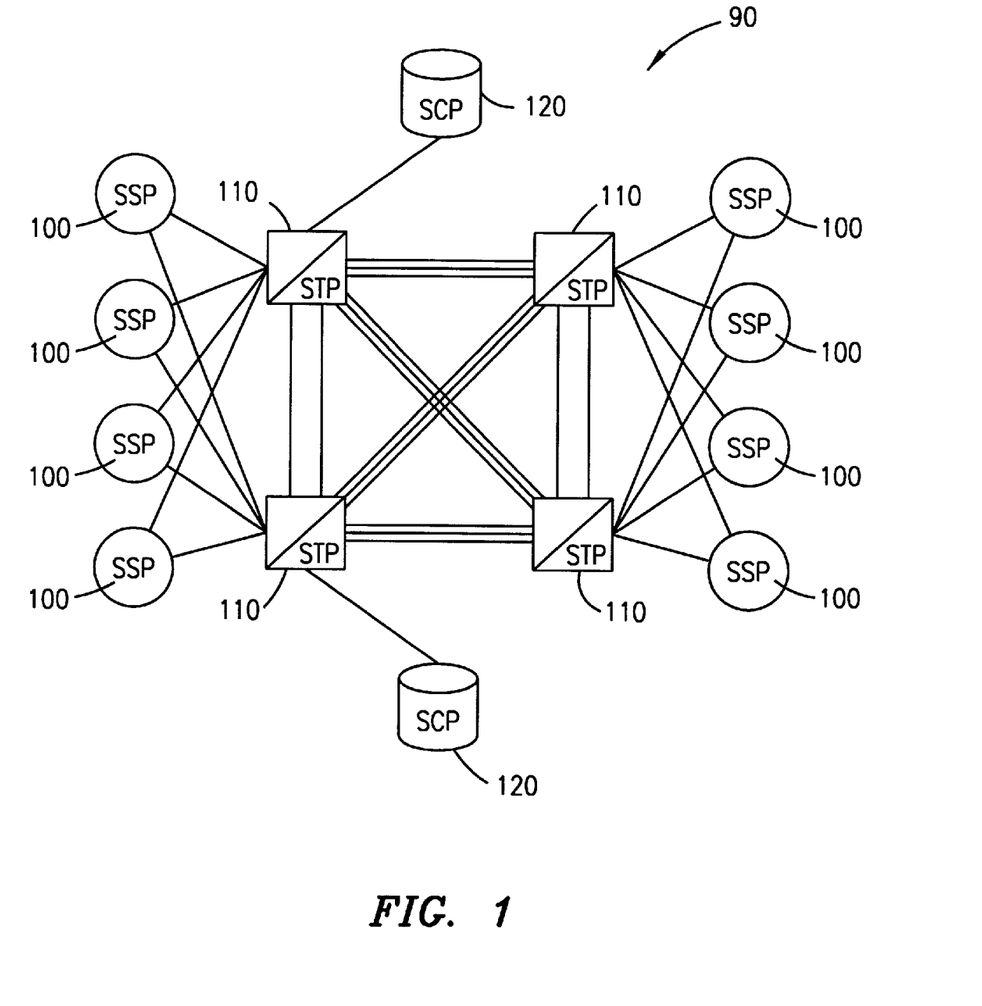
FIG. 1 is a block diagram illustrating some of the basic components used in an Intelligent Network or an Advanced Intelligent Network for signal switching.

With reference now to FIG. 1 of the drawings, the many Service Switching Points (SSPs) 100 serve as the local exchanges in a telephone network 90, a portion of which is shown in FIG. 1. The SSPs 100 preferably provide an Integrated Services Digital Network (ISDN) interface for the Signal Transfer Points (STPs) 110, as is understood in the art. The signaling information is handed off to the SS7 network and transferred to an end office (another SSP) using SS7 ISDN User Part (ISUP) protocol, which is responsible for all call setup and tear down.

The STP 110 serves as a router, and switches messages received from a particular SSP 100 through the network 90 to their appropriate destinations (another SSP 100). As is also understood in the art, the STP 110 receives messages in packet form from the SSPs 100. These packets are either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information, as is understood in the art.

Currently, many large companies utilize a private branch exchange (PBX) to handle the switching for all calls to and from telephone extensions within the company. With PBX systems, proprietary phones can offer a multitude of high-tech features that greatly enhance the systems capability, such as call forwarding, conference calling, speed dialing, linked voicemail, which allows users to reach their voicemail from any phone at any company location without dialing into the system from an outside line, and station detailed message recording (SMDR), which provides the calling records of every extension in the system. ISDN protocols can be used within a PBX system to provide end-to-end digital communications for both voice and data, eliminating the need for costly dedicated lines for data communications, facsimile and video conferencing.

Figure 2:
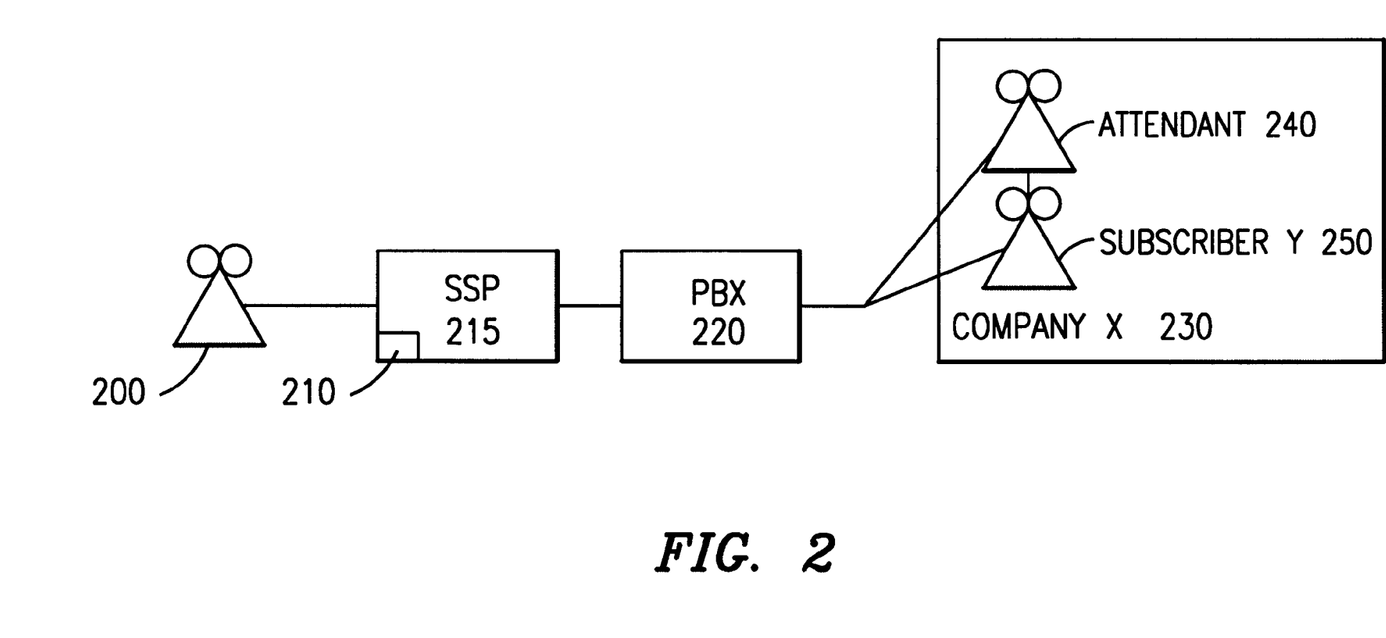
FIG. 2 describes the implementation of an automatic recall feature between a calling and called subscriber.

Typically, as indicated in FIG. 2 of the drawings, when a calling party 200 wishes to contact a subscriber 250 within a PBX system 220, but does not know the direct number for that subscriber, the calling party can dial a number associated with the main switchboard operator 240 or a number associated with an assistant to the desired subscriber 250, which can then be answered by an attendant 240. Attendants 240 have the ability to transfer incoming calls or even "park" calls towards a third party 250 (the desired subscriber). Therefore, if the calling party 200 calls Company X 230 and requests to talk to subscriber Y 250, the attendant 240 can transfer the calling party 200 to subscriber Y's extension 250.

However, if subscriber Y 250 is on the phone (the line is busy), the attendant 240 can pick up the line and offer a variety of choices to the calling party 200. For example, the attendant 240 can take a message, transfer the calling party 200 to subscriber Y's voicemail (not shown), or "park" or "camp" the calling party 200 towards subscriber Y 250. If, however, the calling party 200 wishes to have subscriber Y 250 return the phone call as soon as subscriber Y's 250 line is idle, existing technology only allows the attendant 240 to either monitor subscriber Y's 250 line continuously and once the line becomes idle, inform subscriber Y 250 that the calling party 200 would like to have the call returned, which is cumbersome for the attendant 240, or to "park" or "camp" the phone call against subscriber Y 250, which requires the calling party 200 to wait on the phone listening to elevator music or a ringing tone.

If, however, the calling party 200 dials subscriber Y 250 directly, the calling party 200 presently has the ability to enter a service code, e.g., *99, which initiates an automatic recall feature 210 within the calling party's switch (SSP) 215. The calling party's switch 215 then instructs the called subscriber's switch (PBX) 220 to monitor subscriber Y's 250 line for a predetermined amount of time, e.g., thirty minutes, and when subscriber Y's 250 line becomes idle, the called subscriber's switch 220 initiates a call between subscriber Y 250 and the original calling party 200. The calling party's 200 phone then rings with a special tone to indicate that the recall feature 210 has been activated. When the calling party 200 "answers" the call, the calling party 200 will hear typical ringing until subscriber Y 250 answers the call. However, when the calling party 200 has dialed an attendant, there is currently no method for implementing an automatic recall feature 210 for the desired called subscriber Y 250.

It is, therefore, an object of the present invention to allow an attendant to initiate an automatic recall feature for a third party when the third party's line is busy.

SUMMARY OF THE INVENTION

The present invention is directed to telecommunications systems and methods for allowing an attendant to initiate an automatic recall feature for a third party when that third party's line is busy. When a calling party dials a number associated with an attendant, e.g., a switchboard operator or assistant to the desired called subscriber, and the desired called subscriber's line is busy, the attendant can inform the calling party that the desired called subscriber's line is busy and the calling party can request the attendant to initiate an automatic recall feature for the desired called subscriber. In order to implement this recall feature, the attendant dials a service code followed by the desired called subscriber's extension, which causes the attendant to hear a confirmation tone, and the calling party to hear an announcement, such as: "We are sorry, the person you are calling is busy. The person you are calling will be monitored for 30 minutes. You will be called back when the line becomes idle." Thereafter, the system monitors the desired called subscriber's line until it becomes idle or the thirty minutes has passed. As soon as the line becomes idle, the desired called subscriber receives a special ring back tone. When the desired called subscriber "answers" the call, a call connection from the desired called subscriber to the calling party is initiated. If the calling party's line is then busy, the desired called subscriber can hear an announcement, such as: "We are sorry. The line you are calling is now busy. The line will be monitored for 29 minutes. You will be called back when the line becomes idle." Thereafter, the system monitors the calling party's line until it becomes idle and then initiates a call connection from the calling party to the desired called subscriber. Advantageously, with third party automatic recall, calls to 800 numbers are no longer restricted from using the recall feature because the desired called subscriber is recalling the calling party, instead of vice-versa. Therefore, no 800 number is used, and thus, no restriction occurs.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
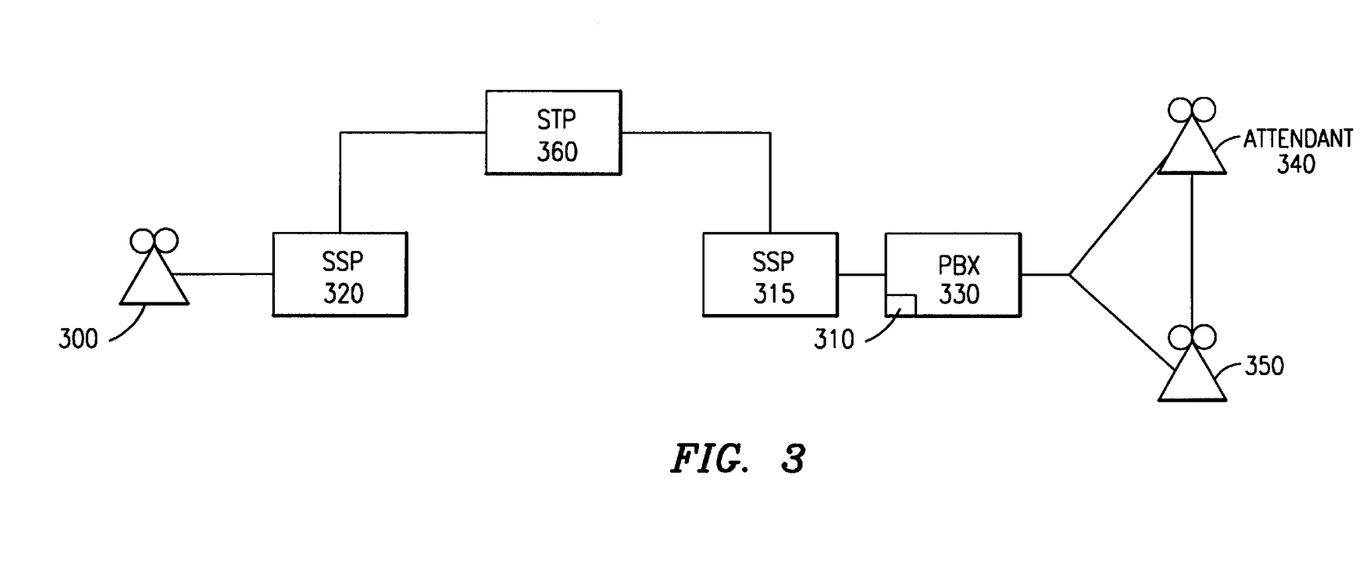
FIG. 3 illustrates the implementation of a third party automatic recall feature in accordance with preferred embodiments of the present invention.
Figure 4A:
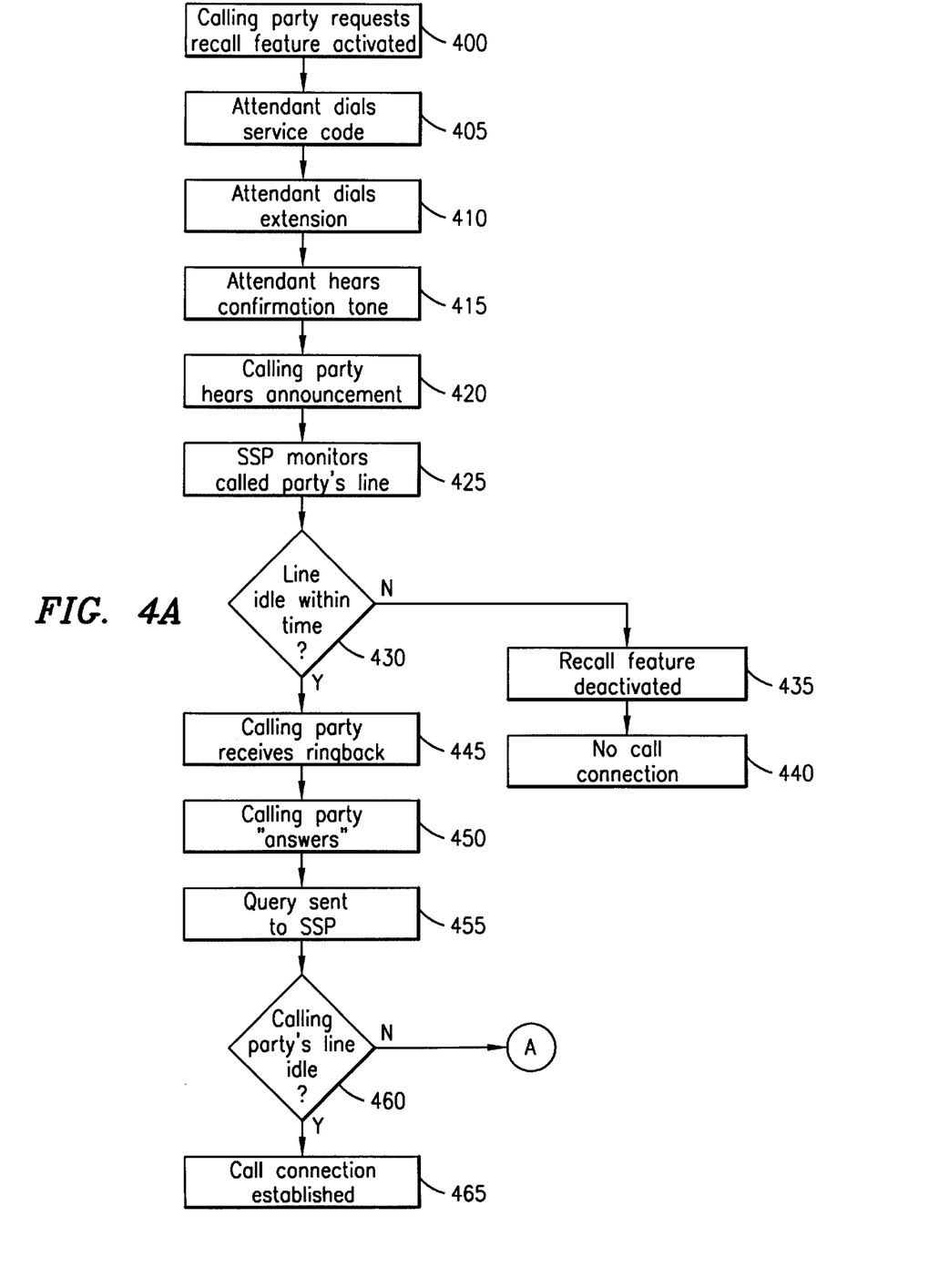
FIGS. 4A and 4B illustrate step, in a sample third party automatic recall embodiment in accordance with preferred embodiments of the present invention.

With reference now to FIG. 3 of the drawings, which is discussed in connection with FIGS. 4A and 4B of the drawings, when a calling party 300 dials a number associated with an attendant 340, e.g., a switchboard operator or an assistant to a desired called subscriber 350, and the desired called subscriber's 350 line is busy, the calling party 300 can request that the attendant 340 activate a third party automatic recall feature 310 for the desired called subscriber 350 (step 400). The automatic recall feature 310 ensures that the desired called subscriber 350 will return the call as soon as the desired called subscriber's 350 line becomes idle. In order to implement this third party automatic recall feature 310, the attendant 340 can dial a service code, e.g., *99, (step 405) followed by the desired called subscriber's 350 extension (step 410), which causes the attendant 340 to hear a confirmation tone (step 415), and the calling parts 300 to hear an announcement (step 420), such as: "We are sorry, the person you are calling is busy. The person you are calling will be monitored for 30 minutes. You will be called back when the line becomes idle."

Thereafter, a Service Switching Point (SSP) 315 serving a switch 330, e.g., a private branch exchange (PBX) 330, which serves the desired called subscriber 350 can begin monitoring the desired called subscriber's 350 line (step 425) until the line becomes idle (step 430). If the line becomes idle within the monitoring period (step 430), the desired called subscriber 350 receives a special ring back tone (step 445). It should be noted that if the desired called subscriber's 350 line does not become idle during the monitoring period (step 430), the recall feature 310 is deactivated (step 435) and no call connection between the calling party 300 and the called subscriber 350 is established (step 440).

Once the desired called subscriber 350 "answers" the ringing (step 450), a Transaction Capabilities Application Part (TCAP) query, which is a Signaling System #7 (SS7) query, can be sent: via a Signaling Transfer Point (STP) 360 to the original calling party's switch 320 (step 455), e.g., a Service Switching Point (SSP) 320, to determine if the calling party's 300 line is idle (step 460). If the calling party's 300 line is idle (step 460), a call connection from the desired called subscriber 350 to the original calling party 300 is established through the PBX 330 and the SSP 320, respectively (step 465).

Figure 4B:
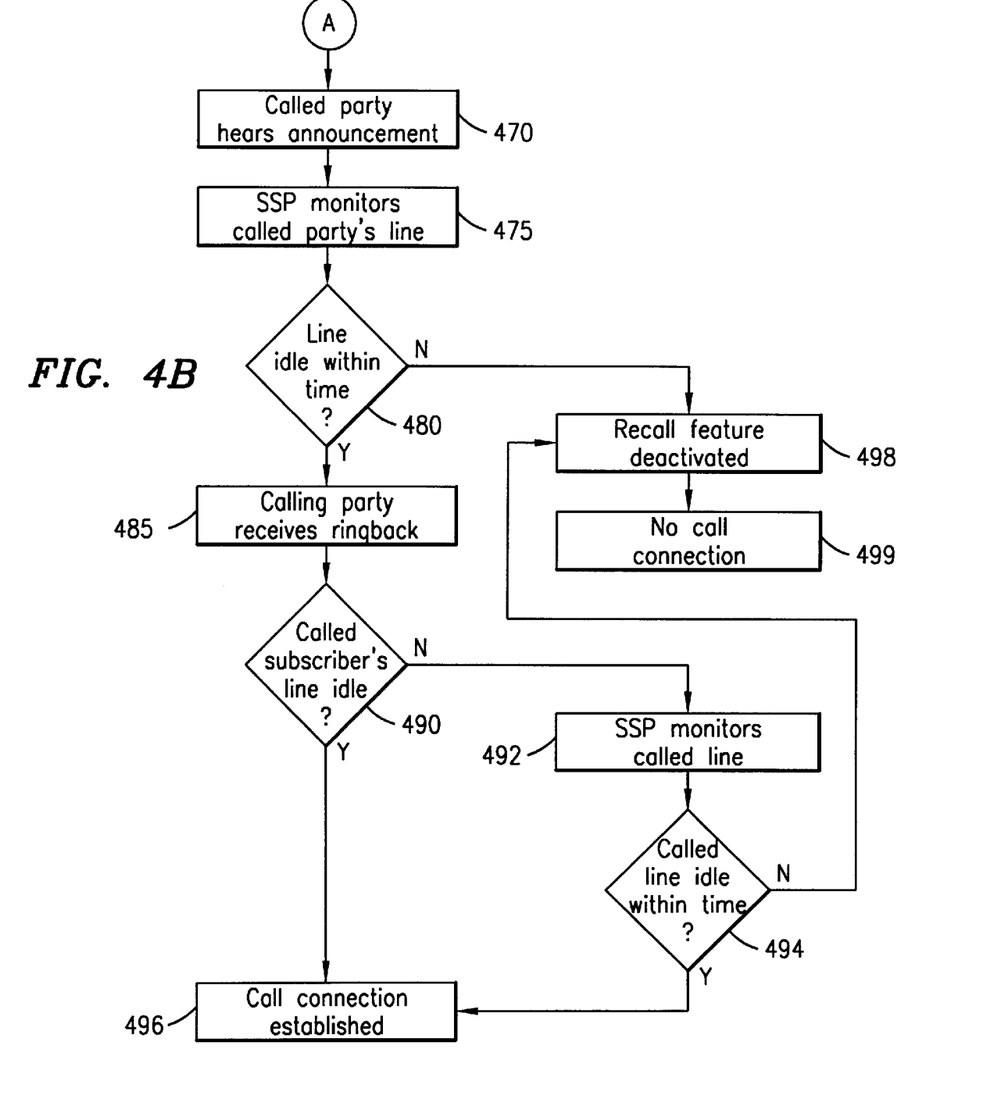

However, as shown in FIG. 4B of the drawings, if the original calling party's 300 line is now busy (step 460), the desired called subscriber 350 then hears an announcement (step 470), such as: "We are sorry. The line you are calling is now busy. The line will be monitored for 29 minutes. You will be called back when the line becomes idle." Thereafter, the SSP 320 monitors the original calling party's 300 line (step 475) until it becomes idle (step 480). If the original calling party's 300 line becomes idle within the monitoring time period (step 480), the original calling party 300 receives a special ring back tone (step 485) and if the desired called party's 350 line is idle (step 490), a call is setup to the desired called party 350 (step 496).

However, if the desired called party's 350 line is now busy (step 490), the SSP 315 serving the PBX or the SSP 320 serving the calling party 300 monitors the desired called party's line (step 492). If the desired called subscriber's 350 line becomes idle (step 494) within a predefined monitoring tire period, a call connection is established between the original calling party 300 and the desired called subscriber 350 (step 496). If the desired called subscriber's 350 line does not become idle within the monitoring period, the third party recall feature 310 is deactivated (step 498) and no call connection is established (step 199). In addition, if the original calling party's 300 line does not become idle within the monitoring time period (step 480), the third party recall feature 310 is also deactivated (step 498) and no call connection is established (step 499).

In preferred embodiments of the present invention, the attendant 340 has the ability to deactivate the last recall or all recalls that are currently queued by entering a service code followed by the called subscriber's 350 extension. Likewise, the desired called subscriber 350 can cancel recall requests that were made by the attendant 340 by entering a service code.

Advantageously, the third party automatic recall feature 310 described herein is initiated by a third party 340, which provides several benefits to the calling party 300. Generally, the person that initiates a recall/callback feature is charged for that feature usage. However, with the third party automatic recall feature 310, the person using the feature is the attendant 340 and the desired called subscriber 350. Therefore, the charge is put against the desired called subscriber 350 instead of the calling party 300. In addition, if the call to the attendant 340 is a toll call for the calling party 300, the calling party 300 is not charged for the returned call. Instead, the charges are billed to the desired called subscriber 350.

Another advantage with the third party automatic recall feature 310 is that calls to 800 numbers, which are generally restricted from being called using the callback feature, are not restricted because the call is established from the desired called subscriber 350 to the original calling party 300 (unless the original calling party's line is busy). Therefore, no 800 number is used, and thus, no restriction occurs.

As will be recognized by those killed in the art, the innovative concepts described in the present application can be modified and varied over a wide range of applications. Accordingly, the scope of patented subject matter should not be limited to any of the specific exemplary teachings discussed.

For example, it should be understood that the third party automatic recall feature described herein can be implemented in any network, wireline or wireless, in which an attendant can activate features, using a service code or other method, for a third party.

What is claimed is:

1. A telecommunications system for automatically recalling a calling terminal when a called terminal becomes idle, said telecommunications system comprising:
    a switch connected to said called terminal, said switch storing a third party automatic recall feature associated with said called terminal therein; and
    an attendant terminal connected to said switch and said called terminal for receiving a call from said calling terminal for said called terminal, said attendant terminal having access to said third party automatic recall feature associated with said called terminal, said attendant terminal activating said third party automatic recall feature associated with said called terminal when said called terminal is in a busy mode, said third party automatic recall feature initiating a call connection from said called terminal to said calling terminal through said switch when said called terminal is in an idle mode, said call connection not being routed through said attendant terminal.

2. The telecommunications system of claim 1, wherein said call connection is not established when said calling terminal is in said busy mode.

3. The telecommunications system of claim 2, further comprising an additional switch connected to said calling terminal, said additional switch monitoring said calling terminal, an additional call connection being initiated from said calling terminal to said called terminal through said additional switch when said calling terminal is in said idle mode.

4. The telecommunications system of claim 3, wherein said additional switch monitors said calling terminal for a predefined time, said additional call connection not being established and said third party automatic recall feature being deactivated when said calling terminal is not in said idle mode within said predefined time.

5. The telecommunications system of claim 3, wherein said additional switch is a Service Switching Point.

6. The telecommunications system of claim 3, wherein said additional call connection is not established and said third party automatic recall feature is deactivated when said called terminal is in said busy mode.

7. The telecommunications system of claim 1, wherein an additional switch connected to said calling terminal determines if said calling terminal is in said idle mode, said call connection being established when said calling terminal is in said idle mode.

8. The telecommunications system of claim 7, wherein said query is a Transaction Capabilities Application Part query.

9. The telecommunications system of claim 1, wherein said call connection is not established and said third party automatic recall feature is deactivated when said called terminal is not in said idle mode within a predefined time.

10. The telecommunications system of claim 1, wherein said switch is a private branch exchange.

11. The telecommunications system of claim 1, wherein said attendant terminal activates said third party automatic recall feature by entering a service code and an extension associated with said called terminal.

12. The telecommunications system of claim 1, wherein said called terminal rings when said called terminal is in said idle mode.

13. A method for automatically recalling a calling terminal when a called terminal becomes idle, said method comprising the steps of:
    storing, by a switch, a third party automatic recall feature associated with said called terminal, said called terminal being connected to said switch;
    receiving, by an attendant terminal connected to said switch and said called terminal, a call from said calling terminal for said called terminal, said attendant terminal having access to said third party automatic recall feature associated with said called terminal;
    activating, by said attendant terminal, said third party automatic recall feature associated with said called terminal when said called terminal is in a busy mode; and initiating, by said third party automatic recall feature, a call connection from said called terminal to said calling terminal through said switch when said called terminal is in an idle mode, said call connection not being routed through said attendant terminal.

14. The method of claim 13, wherein said call connection is not established when said calling terminal is in said busy mode.

15. The method of claim 14, further comprising, after said step of initiating, the steps of:

monitoring, by an additional switch connected to said calling terminal, said calling terminal when said calling terminal is in said busy mode; and initiating, by said third party automatic recall feature, an additional call connection from said calling terminal to said called terminal through said additional switch when said calling terminal is in said idle mode.

16. The method of claim 15, wherein said step of monitoring said calling terminal is performed for a predefined time, said additional call connection not being established and said third party automatic recall feature being deactivated when said calling terminal is not in said idle mode within said predefined time.

17. The method of claim 15, wherein said additional switch is a Service Switching Point.

18. The method of claim 15, further comprising, after said step of initiating said additional call connection, the step of:

determining, by said switch, if said called terminal is in said idle mode, said additional call connection not being established and said third party automatic recall feature being deactivated when said called terminal is in said busy mode.

19. The method of claim 13, further comprising, after said step of initiating, the step of:

determining, by an additional switch connected to said calling terminal, if said calling terminal is in said idle mode, said call connection being established when said calling terminal is in said idle mode.

20. The method of claim 19, wherein said query is a Transaction Capabilities Application Part query.

21. The method of claim 13, wherein said call connection is not established and said third party automatic recall feature is deactivated when said called terminal is not in said idle mode within a predefined time.

22. The method of claim 13, wherein said switch is a private branch exchange.

23. The method of claim 13, wherein said step of activating is performed by said attendant terminal entering a service code and an extension associated with said called terminal.

24. The method of claim 13, wherein said called terminal rings when said called terminal is in said idle mode.

* * * * *

UNITED STATES PATENT AND TRADEMARK OFFICE
CERTIFICATE OF CORRECTION

PATENT NO.     : 6,208,723 B1  
DATED          : March 27, 2001  
INVENTOR(S)    : Bert L. Frey, Jr.

Page 1 of 1

It is certified that error appears in the above-identified patent and that said Letters Patent is hereby corrected as shown below:

Column 5,
Line 15, replace "(step 199)" with -- (step 499) --
Line 47, replace "killed" with -- skilled --

Signed and Sealed this

Fifth Day of November, 2002

*Attest:*

*Attesting Officer*

JAMES E. ROGAN
*Director of the United States Patent and Trademark Office*